United States Patent
Yamazaki et al.

(10) Patent No.: US 9,393,950 B2
(45) Date of Patent: Jul. 19, 2016

(54) METHODS AND SYSTEMS FOR RESTARTING AN ENGINE

(71) Applicant: Ford Global Technologies, LLC, Dearborn, MI (US)

(72) Inventors: Mark Steven Yamazaki, Canton, MI (US); Francis Thomas Connolly, Ann Arbor, MI (US); Jeffrey Allen Doering, Canton, MI (US); Xiaoyong Wang, Novi, MI (US); Rajit Johri, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 172 days.

(21) Appl. No.: 13/947,947

(22) Filed: Jul. 22, 2013

(65) Prior Publication Data

US 2015/0025724 A1    Jan. 22, 2015

(51) Int. Cl.

| B60W 20/00 | (2016.01) |
|---|---|
| B60W 10/06 | (2006.01) |
| B60K 6/48 | (2007.10) |
| B60W 10/02 | (2006.01) |
| B60W 10/08 | (2006.01) |
| B60W 30/184 | (2012.01) |

(52) U.S. Cl.
CPC .................. *B60W 20/10* (2013.01); *B60K 6/48* (2013.01); *B60W 10/02* (2013.01); *B60W 10/06* (2013.01); *B60W 10/08* (2013.01); *B60W 20/40* (2013.01); *B60W 30/184* (2013.01); *B60W 2510/0657* (2013.01); *B60W 2510/083* (2013.01); *B60W 2510/244* (2013.01); *B60W 2710/021* (2013.01); *B60W 2710/083* (2013.01); *Y02T 10/56* (2013.01)

(58) Field of Classification Search
CPC . B60W 10/06; B60W 10/0208; B60W 20/10; B60W 20/40; B60W 2510/0657; B60W 2510/083
See application file for complete search history.

(56) References Cited

U.S. PATENT DOCUMENTS

| 5,740,877 | A | * | 4/1998 | Sasaki | ........................... 180/248 |
|---|---|---|---|---|---|
| 5,947,224 | A | * | 9/1999 | Kouno | ........................... 180/248 |
| 6,330,928 | B1 | * | 12/2001 | Sekiya et al. | ................. 180/242 |
| 7,021,409 | B2 | | 4/2006 | Tamor | |
| 8,036,815 | B2 | * | 10/2011 | Okumoto et al. | ............. 701/110 |
| 8,152,682 | B2 | | 4/2012 | Swales et al. | |
| 8,924,062 | B2 | * | 12/2014 | Reed et al. | ....................... 701/22 |
| 2002/0111239 | A1 | * | 8/2002 | Swales | ............................ 475/35 |
| 2002/0157651 | A1 | * | 10/2002 | Hasegawa et al. | ............ 123/491 |
| 2003/0006076 | A1 | * | 1/2003 | Tamor | .......................... 180/65.2 |
| 2005/0217916 | A1 | * | 10/2005 | Mori et al. | ..................... 180/233 |
| 2008/0099259 | A1 | * | 5/2008 | Tomo | ........................... 180/65.2 |
| 2009/0017988 | A1 | * | 1/2009 | Reuschel | ....................... 477/167 |
| 2009/0312144 | A1 | * | 12/2009 | Allgaier et al. | .................... 477/5 |
| 2010/0299053 | A1 | * | 11/2010 | Okumoto et al. | ............. 701/113 |
| 2011/0056450 | A1 | * | 3/2011 | Notani | ........................ 123/179.4 |
| 2011/0172901 | A1 | * | 7/2011 | Okumoto et al. | ............. 701/113 |
| 2011/0301797 | A1 | * | 12/2011 | Steuernagel et al. | ........... 701/22 |
| 2012/0048243 | A1 | * | 3/2012 | Randoll et al. | ................ 123/497 |

(Continued)

*Primary Examiner* — Mussa A Shaawat
(74) *Attorney, Agent, or Firm* — David Kelley; Alleman Hall McCoy Russell & Tuttle LLP

(57) ABSTRACT

Systems and methods for improving operation of a hybrid vehicle are presented. In one example, torque output of a motor is controlled to include a reserve torque for starting an engine that may be selectively coupled to the motor. Additionally, the motor torque compensates for disconnect clutch closing.

16 Claims, 4 Drawing Sheets

(56) References Cited

U.S. PATENT DOCUMENTS

| | | |
|---|---|---|
| 2012/0083385 A1 | 4/2012 | Smith et al. |
| 2012/0083952 A1* | 4/2012 | Smith et al. ............... 701/22 |
| 2012/0258838 A1* | 10/2012 | Hartz et al. ............... 477/5 |
| 2012/0310458 A1* | 12/2012 | Nawata et al. ............ 701/22 |
| 2013/0253806 A1* | 9/2013 | Ueno ........................ 701/113 |
| 2013/0275014 A1* | 10/2013 | Yang ......................... 701/52 |
| 2013/0297121 A1* | 11/2013 | Reed et al. ................ 701/22 |
| 2013/0297138 A1* | 11/2013 | Fushiki ...................... 701/22 |
| 2013/0304291 A1* | 11/2013 | Nawata et al. ............ 701/22 |

* cited by examiner

METHODS AND SYSTEMS FOR RESTARTING AN ENGINE

FIELD

The present description relates to a system and methods for restarting an engine of a hybrid vehicle. The methods may be particularly useful when the hybrid vehicle includes a driveline with a disconnect clutch.

BACKGROUND AND SUMMARY

A hybrid vehicle driveline may include a driveline disconnect clutch. The driveline disconnect clutch allows a motor in the hybrid driveline to operate independently from an engine in the hybrid driveline. However, the motor may not always have capacity to supply torque that is sufficient to meet driver demand torque. Consequently, the engine may be started and coupled to the motor via the driveline disconnect clutch to meet the driver demand torque. Restarting the engine and coupling the engine to the motor may cause torque disturbances in the driveline that may be objectionable to the driver of the vehicle. Therefore, it may be desirable to provide a way to start the engine and provide the driver demand torque without creating driveline torque disturbances that may disturb the driver.

The inventors herein have recognized the above-mentioned disadvantages and have developed a method for operating a hybrid driveline, comprising in response to an increase in driver demand torque, supplying a portion of the increased driver demand torque before starting the engine; starting the engine; and supplying a remainder of the driver demand torque after starting the engine in response to speed of the engine being within a predetermined speed of a speed of a motor.

Supplying only a portion of driver demand torque before the engine is started allows motor torque to be held in reserve. By reserving a portion of available motor torque for starting an engine, it may be possible to reduce driveline disturbances when a driver demand torque increases to a level that may not be provided via the motor alone. The motor reserve torque may be output as a driveline disconnect is partially closed to rotate the engine for starting. In particular, the motor torque may be increased by an amount equivalent to an amount of torque transferred from the driveline to the engine so that the net driveline torque remains substantially constant (e.g., ±25 N-m) during engine restarting. Further, once the engine is started and the driveline disconnect clutch is being fully closed, motor torque output may be increased to smooth driveline torque as engine torque is delivered to the driveline.

The present description may provide several advantages. In particular, the approach may reduce driveline torque disturbances of a hybrid driveline. Further, the approach may improve vehicle drivability. Further still, the approach may reduce driveline wear, thereby increasing the operating life of the driveline.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
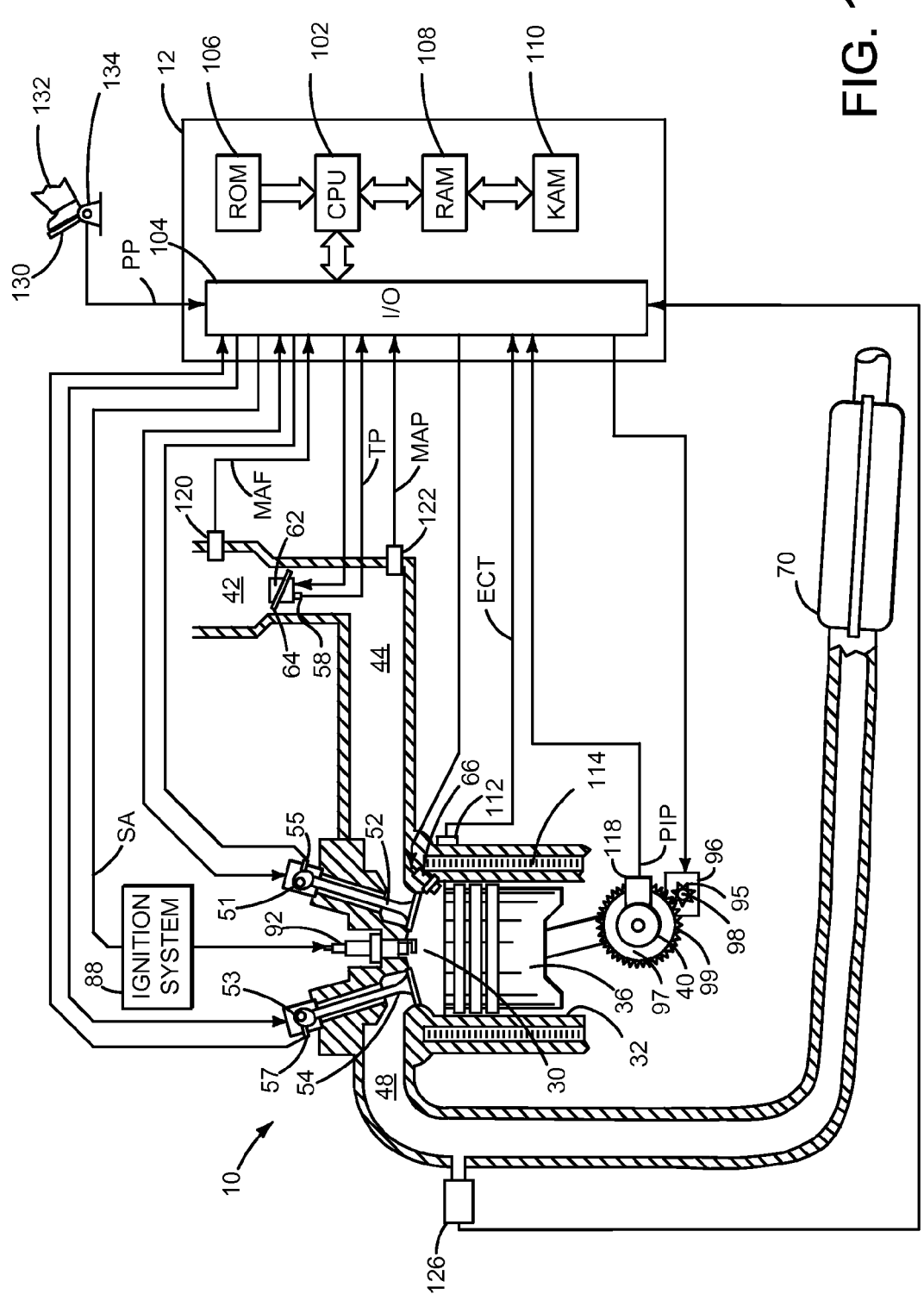
FIG. 1 is a schematic diagram of an engine.
Figure 2:
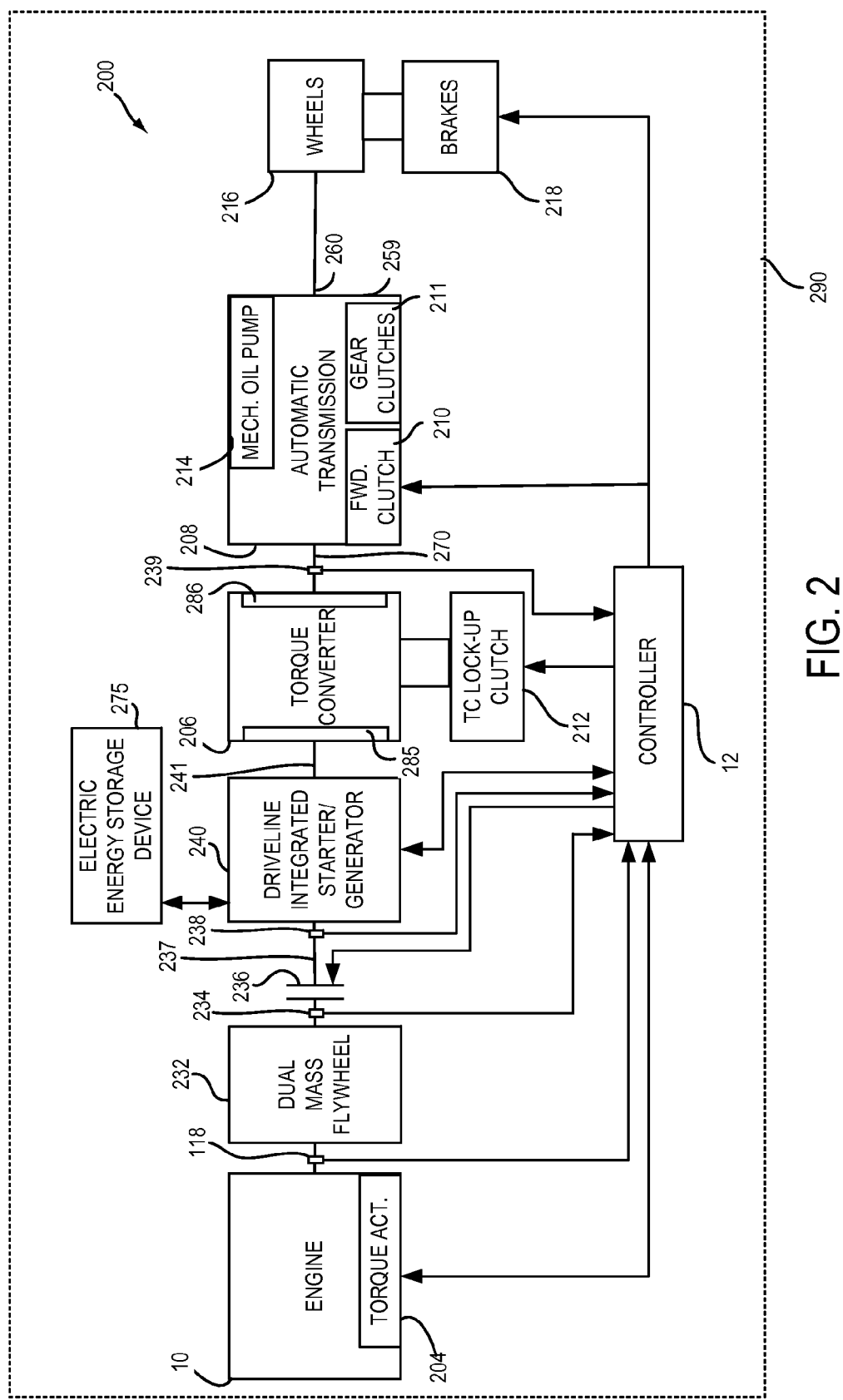
FIG. 2 is shows an example vehicle driveline configuration.
Figure 3:
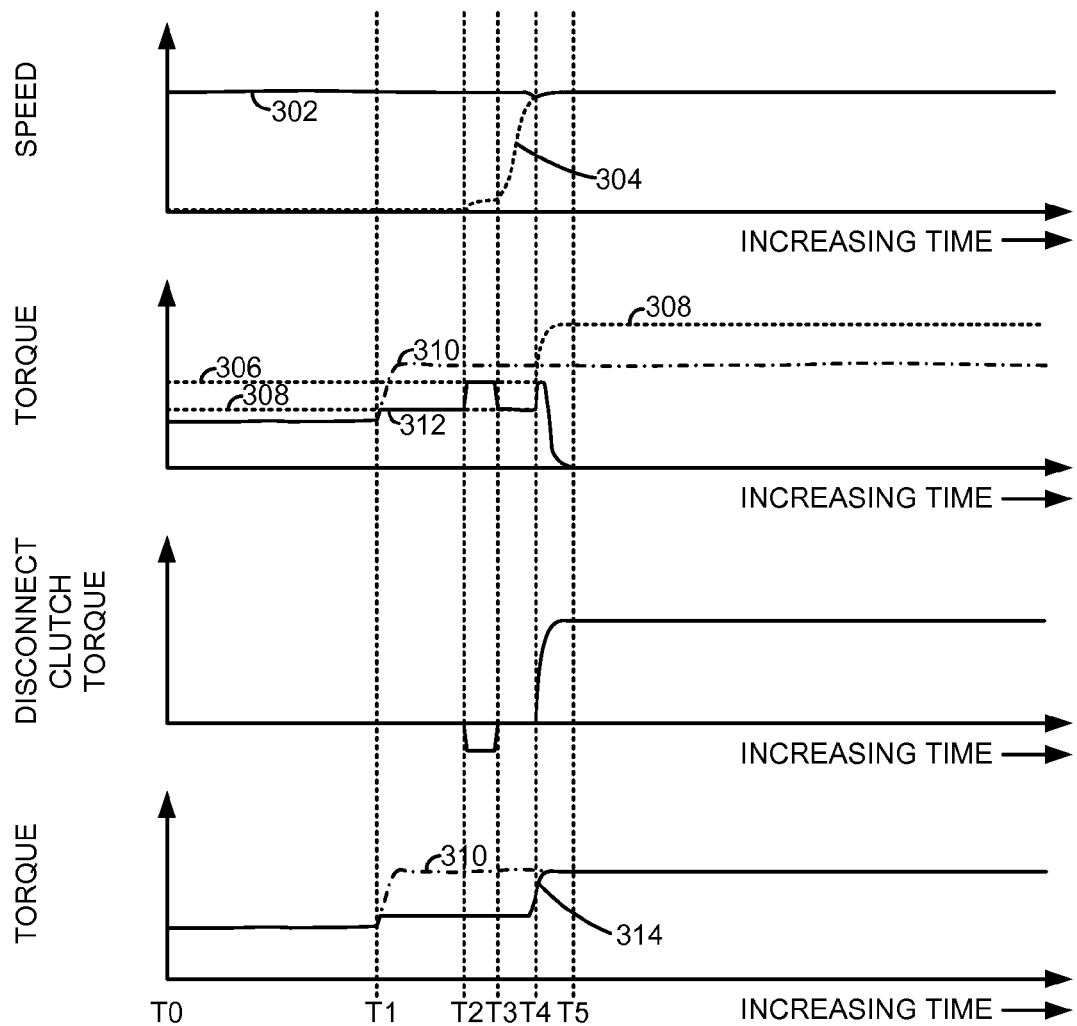
FIG. 3 shows a prophetic vehicle operating sequence.

The present description is related to controlling engine starting for a hybrid vehicle. The hybrid vehicle may include an engine and a driveline integrated starter/generator (DISG) or electric machine (e.g., motor/generator) as shown in FIGS. 1-2. The engine may be operated with or without the DISG during vehicle operation. The DISG is integrated into the driveline on the same axis as the engine crankshaft and rotates whenever a transmission torque converter impeller rotates. Further, the DISG may not be selectively engaged or disengaged with the driveline. Rather, the DISG is an integral part of the driveline. Further still, the DISG may be operated with or without operating the engine. The DISG and engine may be operated as shown in the sequence of FIG. 3 according to the method of FIG. 4.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake cam 51 and exhaust cam 53 may be moved relative to crankshaft 40.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal from controller 12. Fuel is delivered to fuel injector 66 by a fuel system (not shown) including a fuel tank, fuel pump, and fuel rail (not shown). In addition, intake manifold 44 is shown communicating with optional electronic throttle 62 which adjusts a position of throttle plate 64 to control air flow from air intake 42 to intake manifold 44. In one example, a low pressure direct injection system may be used, where fuel pressure can be raised to approximately 20-30 bar. Alternatively, a high pressure, dual stage, fuel system may be used to generate higher fuel pressures. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle as shown in FIG. 2. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle driveline 200 and vehicle 290. Driveline 200 may be powered by engine 10. Engine 10 may be started with an engine starting system shown in FIG. 1 or via DISG 240. Further, engine 10 may generate or adjust torque via torque actuator 204, such as a fuel injector, throttle, etc.

An engine output torque may be transmitted to an input side of dual mass flywheel 232. Engine speed as well as dual mass flywheel input side position and speed may be determined via engine position sensor 118. Dual mass flywheel 232 may include springs and separate masses (not shown) for dampening driveline torque disturbances. The output side of dual mass flywheel 232 is shown being mechanically coupled to the input side of driveline disconnect clutch 236. Disconnect clutch 236 may be electrically or hydraulically actuated. A position sensor 234 is positioned on the disconnect clutch side of dual mass flywheel 232 to sense the output position and speed of the dual mass flywheel 232. The downstream side of disconnect clutch 236 is shown mechanically coupled to DISG input shaft 237.

DISG 240 may be operated to provide torque to driveline 200 or to convert driveline torque into electrical energy to be stored in electric energy storage device 275. DISG 240 has a higher output torque capacity than starter 96 shown in FIG. 1. Further, DISG 240 directly drives driveline 200 or is directly driven by driveline 200. There are no belts, gears, or chains to couple DISG 240 to driveline 200. Rather, DISG 240 rotates at the same rate as driveline 200. Electrical energy storage device 275 may be a battery, capacitor, or inductor. The downstream side of DISG 240 is mechanically coupled to the impeller 285 of torque converter 206 via shaft 241. The upstream side of the DISG 240 is mechanically coupled to the disconnect clutch 236. Torque converter 206 includes a turbine 286 to output torque to input shaft 270. Input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission. Torque converter turbine speed and position may be determined via position sensor 239. In some examples, 238 and/or 239 may be torque sensors or may be combination position and torque sensors.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft (not shown) of transmission 208. Alternatively, the torque converter lock-up clutch 212 may be partially engaged, thereby enabling the amount of torque directly relayed to the transmission to be adjusted. The controller 12 may be configured to adjust the amount of torque transmitted by torque converter 212 by adjusting the torque converter lock-up clutch in response to various engine operating conditions, or based on a driver-based engine operation request.

Automatic transmission 208 includes gear clutches (e.g., gears 1-6) 211 and forward clutch 210. The gear clutches 211 and the forward clutch 210 may be selectively engaged to propel a vehicle. Torque output from the automatic transmission 208 may in turn be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216.

Further, a frictional force may be applied to wheels 216 by engaging wheel brakes 218. In one example, wheel brakes 218 may be engaged in response to the driver pressing his foot on a brake pedal (not shown). In other examples, controller 12 or a controller linked to controller 12 may apply engage wheel brakes. In the same way, a frictional force may be reduced to wheels 216 by disengaging wheel brakes 218 in response to the driver releasing his foot from a brake pedal. Further, vehicle brakes may apply a frictional force to wheels 216 via controller 12 as part of an automated engine stopping procedure.

A mechanical oil pump 214 may be in fluid communication with automatic transmission 208 to provide hydraulic pressure to engage various clutches, such as forward clutch 210, gear clutches 211, and/or torque converter lock-up clutch 212. Mechanical oil pump 214 may be operated in accordance with torque converter 206, and may be driven by the rotation of the engine or DISG via input shaft 241, for example. Thus, the hydraulic pressure generated in mechanical oil pump 214 may increase as an engine speed and/or DISG speed increases, and may decrease as an engine speed and/or DISG speed decreases.

Controller 12 may be configured to receive inputs from engine 10, as shown in more detail in FIG. 1, and accordingly control a torque output of the engine and/or operation of the torque converter, transmission, DISG, clutches, and/or brakes. As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output. Controller 12 may also control torque output and electrical energy production from DISG by adjusting current flowing to and from field and/or armature windings of DISG as is known in the art.

When idle-stop conditions are satisfied, controller 42 may initiate engine shutdown by shutting off fuel and spark to the engine. However, the engine may continue to rotate in some examples. Further, to maintain an amount of torsion in the transmission, the controller 12 may ground rotating elements of transmission 208 to a case 259 of the transmission and thereby to the frame of the vehicle. In particular, the controller 12 may engage one or more transmission clutches, such as forward clutch 210, and lock the engaged transmission clutch(es) to the transmission case 259 and vehicle. A transmission clutch pressure may be varied (e.g., increased) to adjust the engagement state of a transmission clutch, and provide a desired amount of transmission torsion. When restart conditions are satisfied, and/or a vehicle operator wants to launch the vehicle, controller 12 may reactivate the engine by resuming cylinder combustion.

A wheel brake pressure may also be adjusted during the engine shutdown, based on the transmission clutch pressure, to assist in tying up the transmission while reducing a torque transferred through the wheels. Specifically, by applying the wheel brakes 218 while locking one or more engaged transmission clutches, opposing forces may be applied on transmission, and consequently on the driveline, thereby maintaining the transmission gears in active engagement, and torsional potential energy in the transmission gear-train, without moving the wheels. In one example, the wheel brake pressure may be adjusted to coordinate the application of the wheel brakes with the locking of the engaged transmission clutch during the engine shutdown. As such, by adjusting the wheel brake pressure and the clutch pressure, the amount of torsion retained in the transmission when the engine is shutdown may be adjusted.

In alternative examples, the electric machine may be coupled to one input of a multiple step fixed gear ratio transmission while the engine is coupled to a second input of the multiple step fixed gear ratio transmission. The multiple step fixed gear ratio transmission may include a planetary gear set to couple the engine to the electric machine. The method of FIG. 4 may be applied to this driveline configuration as well as others that are anticipated but not mentioned for the sake of brevity.

Thus, the system of FIGS. 1 and 2 provides for a hybrid vehicle system, comprising: an engine; a motor selectively coupled to the engine via a driveline disconnect clutch; and a controller including non-transitory instructions executable to start the engine in response to a desired driver demand torque being within a threshold torque of a first torque limit, the first torque limit based on available torque from the motor minus engine starting torque. The hybrid vehicle system further comprises a driveline disconnect clutch and additional instructions to partially close the driveline disconnect clutch to start the engine. The hybrid vehicle system further comprises additional instructions to fully close a driveline disconnect clutch positioned between the engine and the motor after the engine is started.

In some examples, the hybrid vehicle system further comprises additional instructions to increase torque output from the motor while fully closing the driveline disconnect clutch. The hybrid vehicle system further comprises additional instructions to increase the first torque limit after the driveline disconnect clutch is fully closed. The hybrid vehicle system further comprises additional instructions to determine a second torque limit, the second torque limit an amount of available torque the motor has the capacity to produce.

Referring now to FIG. 3, an example engine operating sequence is shown. The sequence of FIG. 3 may be provided via the system of FIGS. 1 and 2 executing instructions stored in non-transitory memory according to the method of FIG. 4. The sequence of FIG. 3 shows vertical markers T0-T5 which indicate particular times of interest during the operating sequence. All plots in FIG. 3 are referenced to the same time scale and occur at the same time.

The first plot from the top of FIG. 3 is a plot of speed versus time. In particular, the X axis represents time and time begins at the left side of FIG. 3 and increases to the right side of FIG. 3. The Y axis represents engine speed and DISG speed, and speed increases in the direction of the Y axis arrow. DISG speed is represented by the solid line 302. Engine speed is represented by the dashed line 304. The engine speed is equal to the DISG speed when the engine speed is not visible.

The second plot from the top of FIG. 3 is a plot of torque versus time. The X axis represents time and time begins at the left side of FIG. 3 and increases to the right side of FIG. 3. The Y axis represents torque output for several parameters of interest. One parameter is driver demand torque which is indicated by dot-dash line 310. In some examples, the driver demand torque is determined via a position of an accelerator pedal and the driver demand torque is a desired torque at a torque converter impeller. Thus, the driver demand torque may be a sum of engine and DISG torque. Another parameter is DISG or motor torque which is indicated by solid line 312. Maximum or available motor torque is indicated by dash line 306. Driver demand torque limit is indicated by dashed line 308.

The third plot from the top of FIG. 3 is a plot of driveline disconnect clutch torque versus time. The X axis represents time and time begins at the left side of FIG. 3 and increases to the right side of FIG. 3. The Y axis represents driveline disconnect clutch torque (e.g., an amount of torque transferred via the driveline disconnect clutch). Disconnect clutch values above the X axis are positive (e.g., torque is transmitted from the engine to the driveline) and disconnect clutch values below the X axis are negative (e.g., torque is transmitted from the driveline to the engine).

The fourth plot from the top of FIG. 3 is a second plot of torque versus time. In this plot of torque versus time, driver demand torque is shown as dot-dash line 310. Torque delivered to the torque converter impeller is shown as solid line 314. The X axis represents time and time begins at the left side of FIG. 3 and increases to the right side of FIG. 3. The driver demand torque is equal to the torque converter impeller torque when the driver demand torque is not visible.

At time T0, the DISG is operating and the engine is stopped. Additionally, the driveline disconnect clutch is not transferring torque and is in an open state (not shown). The driver demand torque 310 and the DISG or motor torque 312 are at a same level below maximum or available motor torque 306 and the driver demand torque limit 308. The torque provided to the torque converter impeller is the driver demand torque.

At time T1, the driver demand torque 310 increases in response to a driver depressing an accelerator pedal (not shown). The DISG or motor torque 312 increases up to the driver demand torque limit 308 and is held at that level. The available DISG or motor torque 306 and the driver demand torque limit 308 stay at their respective previous levels. The DISG speed remains at its speed before time T1 and the engine remains stopped. The driver demand torque 310 diverges away from the torque delivered to the torque converter impeller 314.

At time T2, the driveline disconnect clutch partially closes allowing the driveline disconnect clutch to transfer torque from the driveline and DISG or motor to the engine in response to the increase in driver demand torque and DISG output torque being insufficient to supply the driver demand torque 310. The driver demand torque 310 is greater than the available DISG torque 306 and the driver demand torque limit 308. The engine begins to rotate as indicated by engine speed 304 as torque is transferred from the driveline to the engine. The driveline disconnect clutch transfers a negative torque when it is partially closed. DISG speed 302 remains near its previous speed and driver demand torque 310 remains away from torque converter impeller torque 314. DISG torque 312 is increased by using a torque reserve (e.g., torque between available DISG torque 306 and the driver demand torque limit 308.

At time T3, the driveline disconnect clutch is fully opened as indicated by the driveline disconnect clutch torque returning to zero. The DISG torque is reduced at the same rate and by the same amount as the driveline disconnect clutch. The DISG torque returns to a value of the driver demand torque limit. Consequently, the torque delivered to the torque converter impeller 314 remains substantially constant. The driver demand torque 310 remains at a constant value since the driver has not change accelerator pedal position. Engine speed 304 accelerates toward DISG speed 302. Engine torque is not transferred to the driveline as the engine accelerates since the driveline disconnect clutch is in an open state.

At time T4, engine speed 304 is within a predetermined speed of DISG speed 302. Therefore, the driveline disconnect clutch is fully closed in response to engine speed 304 matching DISG speed 302. The driveline disconnect clutch torque increases in response to closing the driveline disconnect clutch. Further, DISG torque output is increased up to the available DISG torque 306 to smooth driveline torque during driveline disconnect clutch closing. The driver demand torque limit 308 is also increased in response to the driveline disconnect clutch is closed, and increasing the driver demand torque limit allows DISG torque and engine torque to increase to torque delivered to the torque converter impeller 314. The driver demand torque limit is raised to the total of available DISG torque and available engine torque.

At time T5, the engine is fully coupled to the DISG, the driver demand torque limit 308 is raised to the available DISG torque and available engine torque. DISG torque 312 is shown at a lower level indicating that the driver demand torque 310 is being provided solely via the engine. The torque converter impeller torque 314 is equal to the driver demand torque 310. The engine speed 304 and DISG speed 302 are at the same level since the driveline disconnect clutch is closed.

In this way, it may be possible to control torque converter impeller torque such that driveline torque is not reduced or modulated during an increase in driver demand torque. Further, the torque converter impeller torque is substantially constant when the engine is started via closing the driveline disconnect clutch. Providing torque to the torque converter impeller in this way may provide a slight hesitation for increasing torque demand conditions; however, such hesitation may be much more acceptable than a reduction in driveline torque or driveline torque oscillations.

Figure 4:
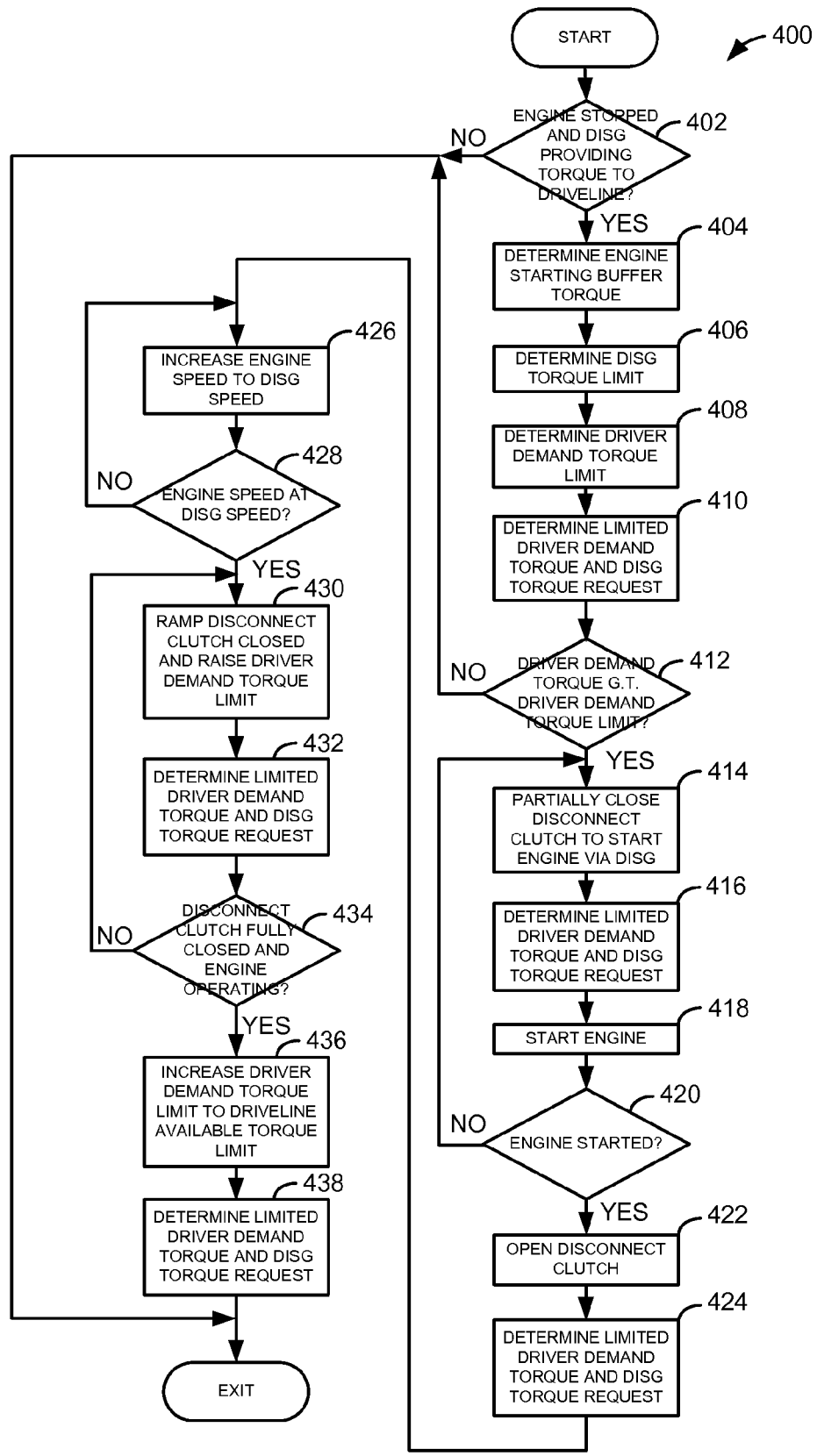
FIG. 4 is a flowchart showing one example method for operating an engine.

Referring now to FIG. 4, a method for operating an engine of a hybrid vehicle is shown. The method of FIG. 4 may be stored as executable instructions in non-transitory memory of a controller such as controller 12 in FIG. 1. Thus, the method of FIG. 4 may be incorporated in to a system as shown in FIGS. 1 and 2. The method of FIG. 4 may also provide the sequence shown in FIG. 3.

At 402, method 400 judges whether or not the engine is stopped and the DISG is providing torque to the driveline. The engine may be determined to be stopped based on engine speed. The DISG may be determined not to be providing or absorbing driveline torque based on current flow to the DISG. If method 400 judges that the engine is not stopped or the DISG is not operating, the answer is no and method 400 proceeds to exit. If the engine is stopped and the DISG is providing torque to the driveline, the answer is yes and method 400 proceeds to 404. Further, in some examples, the driveline disconnect clutch may have to be open to proceed to 404.

At 404, method 400 determines a DISG reserve torque or engine starting buffer torque. In one example, the DISG reserve torque or engine starting buffer torque is an estimate of torque to rotate the engine at cranking speed (e.g., 250 RPM). The engine cranking torque estimate may be empirically determined and stored in memory in a table or function that may be indexed via engine temperature and/or other variables. The DISG reserve or engine starting buffer torque is an amount of DISG torque that may be output from the DISG during reserved or selected conditions, such as during engine starting. Method 400 proceeds to 406 after the DISG reserve torque or engine starting buffer torque is determined.

At 406, method 400 determines a DISG torque limit. The DISG torque limit is the available torque or the torque capacity output of the DISG (e.g., the maximum DISG torque). The DISG torque limit may be stored in memory and indexed via DISG temperature and DISG speed. Method 400 proceeds to 408 after the DISG torque limit is determined.

At 408, method 400 determines driver demand torque and a driver demand torque limit. The driver demand torque may be determined from a position of an accelerator pedal or via a controller command. The driver demand torque corresponds to a desired torque at a torque converter impeller. Thus, the driver demand torque may be met via engine torque, DISG torque, or a combination of engine and DISG torque.

In one example, the driver demand torque limit is available or maximum DISG torque minus DISG reserve or engine starting buffer torque when the driveline disconnect clutch is open. The driver demand torque limit is available or maximum DISG torque plus the available or maximum engine torque when the driveline disconnect clutch is closed. Available or maximum engine torque may be determined from a variable stored in memory that is indexed based on engine speed. The available or maximum engine torque may also be described as the engine's torque producing capacity at a speed. Method 400 proceeds to 410 after the driver demand torque limit is determined.

At 410, method 400 determines a limited driver demand torque and a DISG torque request. Additionally, 404-408 may also be called and executed at 410 to update related control parameters. The limited driver demand torque is the driver demand torque determined at 408 that has been limited. In one example, the limited driver demand torque is determined in the following manner:

if dd_torque>Tdd_limit then lim_dd_torque=Tdd_limit
else if dd_torque<TDISG_min then lim_dd_torque=TDISG_min
else lim_dd_torque=dd_torque Where dd_torque is driver demand torque, Tdd_limit is the driver demand torque limit, lim_dd_torque is limited driver demand torque, and TDISG_min is minimum torque that the DISG may supply. Thus, if driver demand torque is greater than the driver demand torque limit from 408, the limited driver demand torque is the driver demand torque limit from 408. If the driver demand torque is less than the minimum torque that may be supplied from the DISG, the limited driver demand torque is the minimum torque that may be supplied via the DISG. Otherwise, the limited driver demand torque is the driver demand torque.

The DISG torque request command (e.g., the amount of torque requested of the DISG) is also determined at 410. In one example, the DISG torque request is the limited driver demand torque minus the driveline disconnect clutch torque. The driveline disconnect clutch torque may be determined via a table or function that describes torque transferred across the driveline disconnect clutch based on the driveline disconnect clutch command. In other examples, torque transfer through the driveline disconnect clutch may be estimated based on the difference in speed between the input and output sides of the driveline disconnect clutch. The DISG is commanded to the torque value of the DISG torque request. Method 400 proceeds to 412 after the DISG torque request and limited driver demand torque are determined.

At 412, method 400 judges whether or not driver demand torque is greater than the driver demand torque limit. The driver demand torque may be determined from a position of an accelerator pedal or from an automated driver input. If method 400 judges that the driver demand torque is greater than the driver demand torque limit, the answer is yes and method 400 proceeds to 414. Otherwise, the answer is no and method 400 proceeds to exit.

At 414, method 400 partially closes the driveline disconnect clutch from an open position to rotate the engine at cranking speed (e.g., 250 RPM). The drive line disconnect clutch may be partially closed via modulating the driveline disconnect clutch or applying less than full force to close the driveline disconnect clutch. Method 400 proceeds to 416 after the driveline disconnect clutch begins to partially close.

At 416, method 400 determines the limited driver demand torque and the DISG torque request as described at 410. Since the driveline disconnect clutch is partially closing and the engine is stopped, the torque transferred by the DISG is negative. Therefore, when DISG torque is subtracted from the limited driver demand torque, the limited driver demand torque increases by the amount of torque transferred to the engine through the driveline disconnect clutch. Consequently, the DISG torque output is increased to hold the net driveline torque delivered to vehicle wheels substantially constant (e.g., ±25 N-m). Method 400 proceeds to 418 as DISG torque is adjusted to compensate for the closing driveline disconnect clutch.

At 418, method 400 initiates engine starting. The engine is started via supplying fuel and spark to engine cylinders. If the engine is a diesel engine, the engine may be started via supplying only fuel to the engine. Method 400 proceeds to 420 after engine starting is initiated.

At 420, method 400 judges whether or not the engine has started. In one example, the engine may be determined to be started if the engine accelerates to a predetermined speed above the engine cranking speed. Alternatively, the engine may be determined to be started in response to pressure in engine cylinders exceeding a threshold pressure. In still other examples, the engine may be determined to be started after spark and fuel are supplied to engine cylinders for a predetermined number of cylinder compression strokes. If method 400 judges that the engine is started, the answer is yes and method 400 proceeds to 422. Otherwise, the answer is no and method 400 returns to 414.

At 422, method 400 fully opens the driveline disconnect clutch. Alternatively, the driveline disconnect clutch may be opened to an extent that the driveline disconnect clutch transfers less than a threshold amount of torque. Method 400 proceeds to 424 after the driveline disconnect clutch begins to open.

At 424, method 400 determines the limited driver demand torque and the DISG torque request as described at 410. Since the driveline disconnect clutch is opening from a partially closed position, the negative torque transferred by the DISG is reduced toward zero. Therefore, the DISG torque supplied to the driveline is reduced by the amount of torque disengaged from the driveline disconnect clutch. Consequently, the DISG torque output is decreased to hold the net driveline torque delivered to vehicle wheels substantially constant (e.g., ±25 N-m). Method 400 proceeds to 426 as DISG torque is adjusted in response to the opening driveline disconnect clutch.

At 426, method 400 increases engine speed to the DISG speed. Engine speed may be controlled via a combination of one or more torque actuators including engine throttle position, spark timing, cam timing, and fuel amount. Method 400 proceeds to 428 after beginning to increase engine speed.

At 428, method 400 judges whether or not engine speed is within a predetermined speed of DISG speed. In one example, engine speed is compared to DISG speed, if engine speed is less than DISG speed by a threshold speed amount, engine speed has not reached DISG speed. If engine speed is within a predetermined speed of DISG speed, the answer is yes and method 400 proceeds to 430. Otherwise, the answer is no and method 400 returns to 426.

At 430, method 400 ramps the driveline disconnect clutch to a fully closed position so that the driveline disconnect clutch is locked. Additionally, the driver demand torque limit is raised. Method 400 proceeds to 432 after the driveline disconnect clutch begins to close.

At 432, method 400 determines the limited driver demand torque and the DISG torque request as described at 410. Method 400 proceeds to 434 as DISG torque is adjusted to compensate for closing the driveline disconnect clutch.

At 434, method 400 judges whether or not the driveline disconnect clutch is fully closed and the engine is operating. In one example, the driveline disconnect clutch may be determined to be fully closed when the speed difference across the driveline disconnect clutch is zero. The engine may be determined to be operating based on engine speed, cylinder pressures, and other engine control parameters. If method 400 judges that the driveline disconnect clutch is fully closed and the engine is operating, the answer is yes and method 400 proceeds to 436. Otherwise, the answer is no and method 400 returns to 430.

At 436, method 400 increases the driver demand torque limit to a driveline available torque limit. The driveline available torque limit is a sum of available DISG torque and available engine torque. Method 400 proceeds to 438 after the drive demand torque limit is increased.

At 438, method 400 determines the limited driver demand torque and the DISG torque request as described at 410. Method 400 proceeds to exit as DISG torque is adjusted to compensate for closing the driveline disconnect clutch.

Thus, the method of FIG. 4 provides for a method for operating a hybrid driveline, comprising: in response to an increase in driver demand torque, supplying a portion of the increased driver demand torque before starting the engine; starting the engine; and supplying a remainder of the driver demand torque after starting the engine in response to speed of the engine being within a predetermined speed of a speed of a motor. The method includes where supplying the portion of the increased driver demand torque includes increasing torque to vehicle wheels, and where increasing torque to vehicle wheels includes increasing motor torque output to the hybrid driveline up to a first torque limit. The method includes where the first torque limit is based on available torque from a motor minus engine starting torque. The method includes where the first torque limit is a driver demand torque limit.

The method also further comprises increasing the driver demand torque limit in response to a speed of the engine being within a predetermined speed of the motor. The method further comprises partially closing a driveline disconnect clutch during starting the engine. The method includes where the available torque from the motor varies with motor temperature and battery state of charge.

The method of FIG. 4 also provide for operating a hybrid driveline, comprising: in response an increase in driver demand torque, supplying torque to the hybrid driveline up to a first torque limit, the first torque limit based on available torque from a motor minus engine starting torque; starting an engine via the motor; and increasing the first torque limit in response to a speed of the engine being within a predetermined speed of a speed of the motor. The method further comprises partially closing a driveline disconnect clutch to start the engine. The method further comprises opening the driveline disconnect clutch in response to starting the engine.

In some examples, the method further comprises closing the disconnect clutch in response to a speed of the engine being within a predetermined speed of a speed of the motor. The method further comprises increasing motor torque to the available torque from the motor during closing the disconnect clutch. The method includes where torque supplied to the hybrid driveline is provided via the motor before starting the engine. The method further comprises supplying the driver demand torque after starting the engine.

As will be appreciated by one of ordinary skill in the art, method described in FIG. 4 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for operating a hybrid driveline, comprising:
    in response to an increase in a driver demand torque, supplying a portion of the increase in the driver demand torque to the hybrid driveline before starting an engine, where supplying the portion of the increased driver demand torque includes increasing torque to vehicle wheels, and where increasing torque to vehicle wheels includes increasing motor torque output to the hybrid driveline up to a first driver demand torque limit;
    starting the engine in response to the driver demand torque exceeding the first driver demand torque limit;
    supplying a remainder of the increase in driver demand torque to the hybrid driveline after starting the engine in response to speed of the engine being within a predetermined speed of a speed of a motor;
    increasing the driver demand torque limit to a second torque limit in response to a speed of the engine being within a predetermined speed of the motor; and
    partially closing a driveline disconnect clutch during starting the engine.

2. The method of claim 1, where the first torque limit is based on available torque from the motor minus engine starting torque.

3. The method of claim 1, where the first torque limit is a driver demand torque limit.

4. The method of claim 2, where the available torque from the motor varies with motor temperature and battery state of charge.

5. A method for operating a hybrid driveline, comprising:
    in response an increase in driver demand torque, supplying torque to the hybrid driveline up to a first driver demand torque limit, the first driver demand torque limit based on a maximum torque from a motor minus engine starting torque;
    starting an engine via the motor in response to the driver demand torque exceeding the first driver demand torque limit; and supplying torque to the hybrid driveline greater than the first driver demand torque limit in response to a speed of the engine being within a predetermined speed of a speed of the motor.

6. The method of claim 5, further comprising partially closing a driveline disconnect clutch to start the engine.

7. The method of claim 6, further comprising opening the driveline disconnect clutch in response to starting the engine.

8. The method of claim 7, further comprising closing the disconnect clutch in response to the speed of the engine being within the predetermined speed of a speed of the motor.

9. The method of claim 8, further comprising increasing motor torque to the maximum torque from the motor during closing the disconnect clutch.

10. The method of claim 5, where torque supplied to the hybrid driveline is provided via the motor before starting the engine.

11. The method of claim 5, further comprising supplying the driver demand torque after starting the engine.

12. A hybrid vehicle system, comprising:
an engine;
a motor selectively coupled to the engine via a driveline disconnect clutch; and
a controller including non-transitory instructions executable to start the engine in response to a desired driver demand torque being within a threshold torque of a first driver demand torque limit, the first driver demand torque limit based on maximum torque from the motor minus engine starting torque, and additional instructions to increase the first driver demand torque limit after the driveline disconnect clutch is fully closed.

13. The hybrid vehicle system of claim 12, further comprising additional instructions to partially close the driveline disconnect clutch to start the engine.

14. The hybrid vehicle system of claim 12, where the driveline disconnect clutch is positioned between the engine and the motor and further comprising additional instructions to fully close the driveline disconnect clutch after the engine is started.

15. The hybrid vehicle system of claim 14, further comprising additional instructions to increase torque output from the motor while fully closing the driveline disconnect clutch.

16. The hybrid vehicle system of claim 12, further comprising additional instructions to determine a second torque limit, the second torque limit an amount of available torque the motor has the capacity to produce.

* * * * *